US009231779B2

(12) United States Patent
Bernhard et al.

(10) Patent No.: US 9,231,779 B2
(45) Date of Patent: Jan. 5, 2016

(54) REDUNDANT AUTOMATION SYSTEM

(75) Inventors: Rene Bernhard, Erlangen (DE);
Andreas Vogt, Stutensee-Buechig (DE)

(73) Assignee: Siemens Aktiengesellschaft, Munich (DE)

( * ) Notice: Subject to any disclaimer, the term of this patent is extended or adjusted under 35 U.S.C. 154(b) by 158 days.

(21) Appl. No.: 13/435,510

(22) Filed: Mar. 30, 2012

(65) Prior Publication Data
US 2012/0254377 A1 Oct. 4, 2012

(30) Foreign Application Priority Data

Mar. 31, 2011 (EP) ..................................... 11160642

(51) Int. Cl.
*H04L 12/24* (2006.01)
*H04L 12/40* (2006.01)
*H04L 12/46* (2006.01)
*H04L 12/801* (2013.01)

(52) U.S. Cl.
CPC ...... *H04L 12/40195* (2013.01); *H04L 12/4625* (2013.01); *H04L 41/0846* (2013.01); *H04L 47/10* (2013.01); *H04L 2012/4026* (2013.01)

(58) Field of Classification Search
CPC ........ G06F 15/177; G06G 7/04; H04L 12/24; H04L 2012/4026
USPC .......................................................... 709/220
See application file for complete search history.

(56) References Cited

U.S. PATENT DOCUMENTS

| 2003/0041110 | A1* | 2/2003 | Wenocur et al. | 709/206 |
| 2005/0065669 | A1 | 3/2005 | Roux et al. | |
| 2006/0085839 | A1* | 4/2006 | Brandt et al. | 726/2 |
| 2009/0225766 | A1 | 9/2009 | Ihle et al. | |
| 2010/0211711 | A1* | 8/2010 | Kuschke et al. | 710/110 |

FOREIGN PATENT DOCUMENTS

| WO | WO 01/45348 | 6/2001 |
| WO | WO 2004/042482 | 5/2004 |

* cited by examiner

*Primary Examiner* — David X Yi
*Assistant Examiner* — Sibte Bukhari
(74) *Attorney, Agent, or Firm* — Cozen O'Connor

(57) ABSTRACT

A method for redundantly operating an automation system comprising one or more user computers, at least two gateway computers and a plurality of programmable logic controllers, the user computers and the gateway computers being connected to a first bus system of a first type and the gateway computers and the programmable logic controllers being connected to a second bus system of a second type, as a result of which the programmable logic controllers can be controlled and/or monitored by the user computers via one of the gateway computers, wherein to set up a communication link between one of the user computers and one or more of the programmable logic controllers, the user computer contacts a virtual gateway computer having a virtual identifier for all gateway computers of the automation system, which virtual gateway computer establishes a physical communication link to a selected one of the gateway computers.

20 Claims, 2 Drawing Sheets

REDUNDANT AUTOMATION SYSTEM

BACKGROUND OF THE INVENTION

1. Field of the Invention

The invention relates to automated systems and, more particularly, to a method for redundantly operating an automation system, a gateway computer of an automation system and the automation system.

2. Description of the Related Art

An automation system usually comprises one or more user computers, at least two gateway computers and a plurality of programmable logic controllers (PLCs). The user computers and the gateway computers are connected to a first bus system of a first type. In contrast, the gateway computers and the programmable logic controllers are connected to a second bus system of a second type. Here, the first and second types of bus systems usually use different protocols. The programmable logic controllers can be controlled and/or monitored by the user computer(s) via the gateway computer.

Automation systems of the type described above may have a high degree of complexity due to the multiplicity of programmable logic controllers and/or user computers. For example, such an automation system can be used to control an industrial installation. Here, it is decisively important that the control and/or monitoring of the programmable logic controllers is/are ensured even when individual components fail. Automation systems have a redundant design for this reason.

In the event of a gateway computer failing, for example, the control and/or monitoring of the programmable logic controllers by the user computers must continue to be ensured. For this purpose, a redundant gateway computer can be activated in the event of a fault in the original gateway computer. The redundant gateway computer is often activated manually. This results in it not being possible to control and/or monitor the programmable logic controllers in the period of time between the failure of the original gateway computer and the activation of the redundant gateway computer. In addition, the operation of changing over to the redundant gateway computer is generally associated with additional configuration effort.

SUMMARY OF THE INVENTION

It is an object of the present invention to improve the availability of an automation system in the event of a gateway computer failing. In particular, it is an object to provide redundancy which can be effected in an automated manner without administrative interventions by an administrator of the automation system.

These and other objects and advantages are achieved in accordance with the invention by a gateway computer, an automation system and a method for redundantly operating an automation system comprising one or more user computers, at least two gateway computers and a plurality of programmable logic controllers (PLCs). In general, the respective number of user computers, gateway computers and programmable logic controllers can be selected in an arbitrary manner. The user computers, the gateway computers and the programmable logic controllers each typically have an identifier that is unique for the automation system. The network address of respective communication components of the units is usually used as the identifier.

The user computers and the gateway computers are connected to a first bus system of a first type and the gateway computers and the programmable logic controllers are connected to a second bus system of a second type. The first and second bus systems are usually implemented using different technologies and usually use different communication protocols. In principle, it would also be conceivable for the first and second bus systems to be formed using the same technology using the same communication protocol or different communication protocols. The first bus system is preferably configured to perform communication based on the Transmission Control Protocol/Internet Protocol (TCP/IP), in particular in accordance with the Open Productivity and Connectivity (OPC) standard. In contrast, the second bus system is preferably a proprietary installation bus, i.e., a field bus, such as Profibus. A first bus system based on the TCP/IP protocol allows conventional computer components to be used as the user computers and gateway computers due to its standardization. In contrast, the proprietary second bus system is oriented to the programmable logic controllers used in the automation system and to the protocols used by the controllers.

In a known manner, the programmable logic controllers can be controlled and/or monitored by the user computers via one of the gateway computers, where the gateway computers perform protocol transformation between the protocol of the first bus system and the protocol of the second bus system. Each gateway computer can be contacted by more than one user computer for communication with the programmable logic controllers. As a result, the gateway computers provide a server functionality. In contrast, the user computers have the functionality of a client.

In order to set up a communication link between the user computers and one or more of the programmable logic controllers, the user computer contacts a virtual gateway computer having a virtual identifier for all gateway computers of the automation system, which virtual gateway computer establishes a physical communication link to a selected one of the gateway computers. The virtual gateway computer may be provided, for example, by a network load balancing (NLB) mechanism. This mechanism ensures uniform load distribution between the gateway computers forming the virtual computer. The NLB mechanism is formed by respective software components that communicate with one another in the gateway computers of the automation system, where the software components communicate with one another to provide the functionality. In particular, it is stipulated in this case, based on the respective load of the gateway computers, which of the gateway computers is the selected gateway computer. From the point of view of the user computer, all gateway computers can be reached under the same identifier, preferably a network address. Consequently, irrespective of the actual number of gateway computers of the automation system, there is only a single gateway computer from the point of view of the user computer. This results in the advantages of the simplified configuration of the user computer and the possibility to provide redundancy in an automated manner with respect to the gateway computers.

In a next step, configuration parameters are generated and stored for the communication link in the selected, active gateway computer. These configuration parameters are required for the control and/or monitoring of the programmable logic controllers by the user computer and are stored once in the selected gateway computer.

Finally, in order to provide the redundancy of the selected gateway computer, the configuration parameters for the communication link are interchanged between the active gateway computer and the remaining gateway computers. As a result, it is possible to ensure that the configuration parameters required for control and/or monitoring are already available in all other gateway computers of the automation system, with the result that, if the selected gateway computer fails, it is possible to quickly change over the communication link to another gateway computer.

The method has the advantage that, from the point of view of the user computer, there is only a single gateway computer, with the result that there is no need for the user computer to be specially configured for redundancy. Since the configuration parameters are interchanged, i.e., compared, between the gateway computers, the user computer need not recreate these parameters after the selected gateway computer has failed. From the point of view of the user computer, the failure of the selected gateway computer constitutes a line interruption between the selected gateway computer and the first system. From the point of view of the user computer, the configuration data are still present in the other gateway computers at the run time after this "link interruption" even though the selected gateway computer is no longer available. This provides, as a result, transparent redundancy of the gateway functionality.

The invention also provides a gateway computer for redundantly operating an automation system of the type described above, which gateway computer is configured to process a message from the user computer to a virtual gateway computer having a virtual identifier for all gateway computers of the automation system to set up a communication link between the user computer and one or more of the programmable logic controllers. Here, the gateway computer establishes a physical communication link to a selected one of the gateway computers. The gateway computer is also configured to generate and store configuration parameters for the communication link. Finally, the gateway computer in accordance with the invention is configured to interchange the configuration parameters for the communication link with the remaining gateway computers of the automation system.

An automation system in accordance with the invention comprises at least two gateway computers of the type described above.

In one preferred embodiment, interchange of the configuration data also includes changes to the configuration data. The configuration data are therefore interchanged dynamically and in accordance with the invention. A change to the configuration data may be of the content-related type, for example. However, deletion of a configuration data item or of the complete configuration data in the selected gateway computer may also likewise result in deletion of this configuration data item or these configuration data in the other gateway computers.

In another advantageous embodiment, if the selected gateway computer fails, a new physical communication link is established between the user computer and another one of the gateway computers as the new selected gateway computer. Failure of the selected computer may be, on the one hand, the actual unavailability of this selected gateway computer. Failure should likewise be understood as meaning a line interruption between the selected gateway computer and the bus system or the user computer. Failure may comprise the non-operation of hardware and/or software components.

The new physical communication link is expediently automatically set up, where the configuration parameters for the failed communication link that are stored in the new selected gateway computer are used for the new communication link. Therefore, there is no need for the user computer to recreate the configuration data after failure of the selected gateway computer.

In another advantageous embodiment, after the changeover from the failed selected gateway computer to the new selected gateway computer, the new selected gateway computer recognizes the changeover from a message from the user computer, which message is addressed to the virtual gateway computer and activates the communication link, and the message is received from the user computer due to the interrupted old communication link. The user computer realizes, after a predefined monitoring time that depends on its configuration, that the (old) gateway computer is no longer available, i.e., there is a link interruption. On account of this, the user computer sets up a new communication link which is automatically set up to one of the other gateway computers by the mechanisms of the virtual gateway computer. That gateway computer which provides the communication link is then the new selected gateway computer. The new selected gateway computer recognizes, from the message transmitted from the user computer to the virtual gateway computer, that the communication link to the programmable logic controllers needs to be established and can resort to the dynamically interchanged configuration data for this purpose.

In an alternative embodiment, there is no need to explicitly receive a message from the user computer, which message activates the communication link. In this case, the failure of the (old) selected gateway computer is monitored by the other gateway computers by comparing link data relating to the communication link. When the failure of the selected gateway computers is detected, another of the gateway computers, as the new selected gateway computer, automatically establishes the new communication link to the user computer. This mechanism is known as "failover".

In order to ensure the transparent redundancy of the gateway functionality, provision is also made for all gateway computers to be configured in the same manner and to provide and manage the same address space.

In another embodiment, the configuration parameters comprise context objects, i.e., for controlling and/or monitoring the programmable logic controllers, and optionally certificates. In the sense of the invention, context objects are, for example, data from "sessions" and data from "subscriptions". Sessions are links in one of the gateway computers to the programmable logic controllers. Subscriptions contain information relating to the manner in which data are grouped and/or represented in the user computer, for example, based on particular functionalities of the automation system. Subscriptions may likewise comprise information relating to the registration for services. Functions, such as "monitored items", may also be considered to be context objects. In this case, activated sessions are dynamically interchanged, in particular. In contrast, provision may be made for subscriptions to be dynamically interchanged between the gateway computers irrespective of their status.

It is also preferred if the configuration parameters stored in the gateway computers that have not been selected are not used as long as the selected gateway computer is operating as intended. As a result, clear communication relationships in the communication link are stipulated irrespective of the number of gateway computers provided in the automation system for redundancy purposes.

It is also advantageous if, in addition to the configuration data, information relating to the programmable logic controllers connected to the virtual gateway computer is interchanged, optionally in a dynamic manner. This refinement also contributes to ensuring transparent and virtually delay-free changeover in the case of redundancy.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail below using an exemplary embodiment in the drawings, in which.

DETAILED DESCRIPTION OF THE PREFERRED EMBODIMENTS

Figure 1:
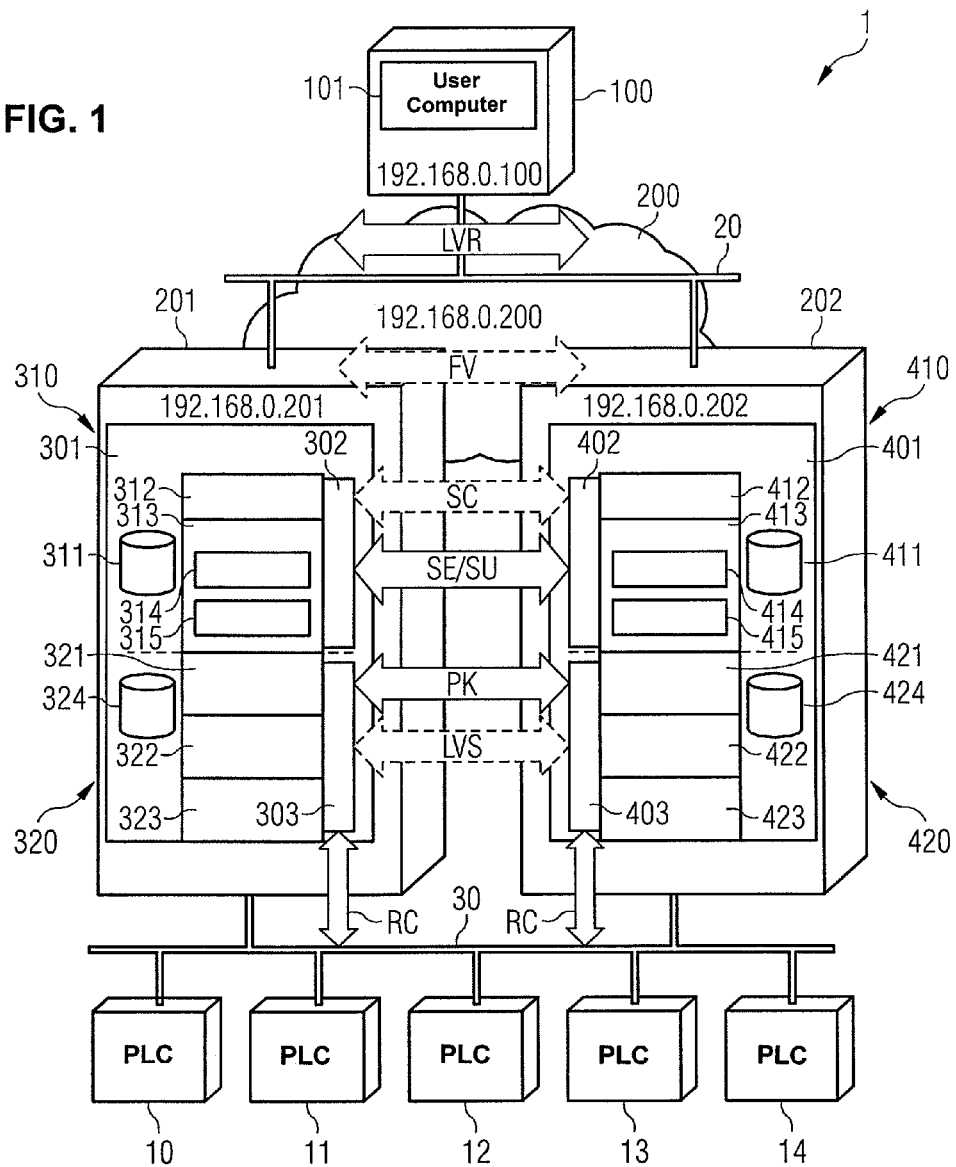
FIG. 1 shows an automation system in accordance with the invention.

The automation system 1 comprises a user computer 100, a first gateway computer 201, a second gateway computer 202 and five programmable logic controllers (PLCs) 10, 11, 12, 13, 14. It should be understood that the number of user computers, gateway computers and programmable logic controllers which is illustrated in the exemplary embodiment is arbitrarily selected. In principle, the automation system in accordance with the invention may comprise a plurality of user computers 100, a larger number of gateway computers 201, 202 and a smaller or larger number of programmable logic controllers 10, 11, 12, 13, 14.

The user computer 100 and the first and second gateway computers 201, 202 are connected to a first bus system 20. The first bus system 20 is of a first type and is preferably based on a communication protocol in accordance with TCP/IP. The first bus system can accordingly be of an Ethernet-based design. Communication is preferably effected in accordance with the OPC standard used for automation systems. The user computer and the gateway computers may thus be provided in the form of conventional PCs.

The first and second gateway computers 201, 202 and the programmable logic controllers 10, 11, 12, 13, 14 are connected to a second bus system 30 which is of a second type. The second bus system 30 is, for example, a proprietary installation bus, i.e., a field bus. The protocol used in this case is oriented to the protocol used by the programmable logic controllers. For example, the second bus system may be a Profibus. The S7 protocol developed by Siemens, for example, may be used as the protocol if the programmable logic controllers 10, 11, 12, 13, 14 are set up for corresponding communication.

The programmable logic controllers 10, 11, 12, 13, 14 make it possible to control and/or monitor technical components of the automation system. For example, pressures, temperatures, rotational speeds, velocities etc. may be monitored and controlled by the programmable logic controllers. The (measurement) data provided by the individual programmable logic controllers 10, 11, 12, 13, 14 may be displayed for a user, together with control parameters, for monitoring purposes, on client software 101 of the user computer 100. For this purpose, it is necessary to provide a communication link between the user computer 100 or its client software 101 and the programmable logic controllers 10, 11, 12, 13, 14. This communication link is established via one of the gateway computers 201, 202, where the gateway computer that provides the communication link represents an active or selected gateway computer.

In the first and second gateway computers that are configured in an identical manner and provide the same address space, server software 301 of the first gateway computer 201 or server software 401 of the second gateway computer 202 is additionally used to perform protocol conversion from the protocol of the first data bus 20 to the protocol of the second data bus 30 and from the protocol of the second data bus 30 to the protocol of the first data bus 20. For this purpose, respective server software 301, 401 comprises software components 310, 410, which are assigned to the protocol of the first bus system 20, and software components 320, 420 which are assigned to the protocol of the second bus system 30 and to the functionality of the programmable logic controllers 10, 11, 12, 13, 14.

In order to be able to ensure communication between the components of the automation system 1, the user computer 100, the first and second gateway computers 201, 202 and the programmable logic controllers 10, 11, 12, 13, 14 each have a unique identifier comprising a network address. For example, the network address 192.168.0.100 is assigned to the user computer 100, the network address 192.168.0.201 is assigned to the first gateway computer and the network address 192.198.0.202 is assigned to the second gateway computer. The programmable logic controllers 10, 11, 12, 13, 14 may have IP addresses or other addresses. For example, the network address 192.168.1.10 is assigned to the programmable logic controller 10, the network address 192.168.1.11 is assigned to the programmable logic controller 11, the network address 192.168.1.12 is assigned to the programmable logic controller 12, the network address 192.168.1.13 is assigned to the programmable logic controller 13 and the network address 192.168.1.14 is assigned to the programmable logic controller 14.

The gateway computers 201, 202 have a mechanism for network load balancing (NLB). This mechanism is provided via a software component in each of the gateway computers and ensures uniform load distribution between the gateway computers with respect to the communication arising via the gateway computers (arrow LVR). For this purpose, a single virtual computer 200 having a network address 192.168.0.200, which is common to all gateway computers, is feigned to the user computer 100 irrespective of the number of gateway computers 201, 202. NLB is a mechanism which is contained, for example, in the Microsoft® server operating systems and provides, for a client, a virtual IP address behind which up to 32 physical servers (here: gateway computers) are combined. When setting up a new communication link from the user computer 100 for the purpose of communicating with the programmable logic controllers, the links are uniformly distributed among the available servers or gateway computers 201, 202 to thereby ensure load distribution. The mechanism is simultaneously used for redundancy which is transparent to the user computer 100 since, for the user computer, all gateway computers 201, 202 can be reached via an IP address (the address of the virtual gateway computer 200). A positive effect is that there is no need for the user computer 100 to be specially configured to provide the redundancy with respect to the physically different gateway computers 201, 202.

A communication link from the user computer 100 to the programmable logic controllers 10, 11, 12, 13, 14 is therefore always set up, as explained, via the virtual computer 200 that decides of the gateway computers 201, 202 will provide the active communication link. For descriptive purposes, it is initially assumed that the first gateway computer 201 constitutes the selected gateway computer.

In this case, configuration parameters are initially generated and stored for the communication link in the selected, active gateway computer 201. This is effected by the server software 301 which, for this purpose, comprises, via a configuration database 311, a stack 312 and an Software Development Kit (SDK) server 313 comprising a context object 314 relating to sessions and a context object 315 relating to subscriptions. In addition, a node manager 321, a IO manager 322, a protocol connection 323 and a configuration database 324 are included in the part 320 assigned to the second bus system 30. The reference symbols 302, 303 are used to denote redundancy management units which are assigned to the software component 310 and to the software component 320. This assignment, which is logically implemented in the exemplary embodiment, need not be implemented in the form of two separate redundancy management units in practice. It is sufficient if one single redundancy management unit is provided for each item of server software.

In a corresponding manner, the second gateway computer 202 has identically constructed server software 401, the same components or functionalities being denoted using a leading "4" instead of a leading "3" in the reference symbols.

The configuration parameters comprise, in particular, context objects for controlling and/or monitoring the programmable logic controllers as well as optionally certificates. The context objects contain data from sessions and data from subscriptions or monitored items. Here, data from sessions are generated and managed in the context object 314 and data from subscriptions are generated and managed in the context object 315. Storage can be effected in the configuration database 311. In order to provide the redundancy, the configuration parameters are interchanged between the gateway computers 201, 202 dynamically, i.e., at regular intervals. Interchange can be effected after every change, for example. Temporally periodic data interchange of the configuration parameters is likewise possible.

If the gateway computer 201 fails, the user computer 100 recognizes the link interruption to the programmable logic controllers 10, 11, 12, 13, 14 after a configured monitoring time. Consequently, the user computer 100 produces a new communication link which is set up, via the virtual gateway computer 200, automatically via the redundant gateway computer 202. Since sessions and subscriptions are known on account of the configuration parameters being interchanged, the user computer 100 directly receives data (from the programmable logic controllers) after the new communication link has been established without the need to create new subscriptions for this purpose. With this procedure, no updating of data is admittedly ensured during the changeover from the gateway computer 201 to the redundant gateway computer 202. However, since there is a link fault from the point of view of the user computer, the interruption is brief. The monitoring response time before recognizing the failure of the previously active, selected gateway computer is ten seconds, for example. Five seconds of this are needed to recognize the failure and a further five seconds are needed to redistribute the load.

In the event of a redundancy changeover from the gateway computer 201 to the gateway computer 202, the gateway computer 202 recognizes the changeover from the fact that the user computer 100 calls a function to restore the communication link on account of the apparent line interruption. With the reception of the apparent corresponding message, the gateway computer 202 knows that it is now responsible for all configuration data (objects which were generated in the context of a session (subscriptions and monitored items)). As a result, it reads the corresponding configuration data from its configuration database 411, 424 and activates them for the programmable logic controllers 10, 11, 12, 13, 14. Since the configuration data (sessions and subscriptions) are compared, the user computer 100 does not need to recreate the configuration data after the failure of the gateway computer 201. As explained, the user computer 100 interprets the failure of the gateway computer as a line interruption. From the point of view of the user computer, the configuration data are still available at run-time after the link interruption, even if the original, selected gateway computer 201 is no longer available.

In an alternative embodiment, data relating to the communication link are interchanged between the redundant gateway computers 201, 202 during operation of the automation system 1. This makes it possible to ensure interruption-free takeover of a communication link from the gateway computer 201 to the gateway computer 202. This is diagrammatically represented by the arrow FV which represents failure protection of a link between a gateway computer and the first bus system. This mechanism is also referred to as "failover". Here, the interruption-free takeover of the communication link may be ensured by the operating system which also provides the NLB mechanism.

In addition to the configuration parameters comprising sessions and subscriptions (see, e.g., arrow SE/SU), information relating to a secure communication channel, for example, keys and certificates, may also be interchanged between the gateway computers 201, 202 (see, e.g., arrow SC).

The reference symbols SE/SU are used to denote the interchange of the configuration data between the gateway computers 201, 202. The redundancy modules 302, 402 ensure that the objects generated by the user computer 100 in the selected gateway computer 201 are compared among the different gateway computers. Here, the previously mentioned certificates of the user computer 100 may also be compared. If a context object 314, 315 (session, subscription or monitored item) is created in the gateway computer 201 by the user computer 100, this context object is mirrored in the other gateway computer 202. However, the mirrored subscriptions and monitored items in the gateway computer 202 provided for redundancy purposes do not become active for the programmable logic controllers. The mirroring is performed, i.e., for data and event monitored items.

Only activated sessions are compared. Subscriptions are compared irrespective of their status. In order to be able to take dynamic changes into account, changes to sessions, subscriptions or monitored items are likewise provided. If, for example, sessions or subscriptions are deleted, the mirrored or compared corresponding objects in the other gateway computers 202 are also deleted. A session is understood as meaning a communication link via a selected gateway computer (here, 201). A subscription is understood as meaning the manner in which the data are conditioned and processed. Subscriptions likewise comprise registrations for particular services.

There is no need to compare active alarms because every gateway computer has a current image of alarms. An alarm is understood as meaning a message from the programmable logic controller. In addition, programmable logic controllers 10, 11, 12, 13, 14 registered in the gateway computers are also compared.

It is advantageous to compare rejected certificates of the user computer 100. Certificates of the user computer are accepted manually in all gateway computers 201, 202.

PK is used to provide a check of configuration data of the node managers 321, 421 via the redundancy management units 303, 403. On account of the fact that all gateway computers 201, 202 of the automation system 1 should have an identical configuration, a discrepancy should not arise. In the event of a discrepancy in the configurations of the node managers 321, 421, it is necessary for a user of the automation system to manually intervene. The user can correctly create the topology of the automation system in the configuration data.

The described topology and the functionalities for providing redundancy also enable load distribution with respect to the programmable logic controllers. This is indicated by the arrow LVS. This enables load distribution according to actually occurring volumes of data, in contrast to the load distribution by the NLB mechanism which strictly performs uniform distribution of user computers to the existing gateway computers. Load distribution is implemented between the communication layers in the different gateway computers.

In FIG. 1, the reference symbols RC are also used to provide mechanisms for "S7 Redconnect" methods. These are used to further increase the availability of the link to the programmable logic controllers. This increase can be optionally used.

Figure 2:
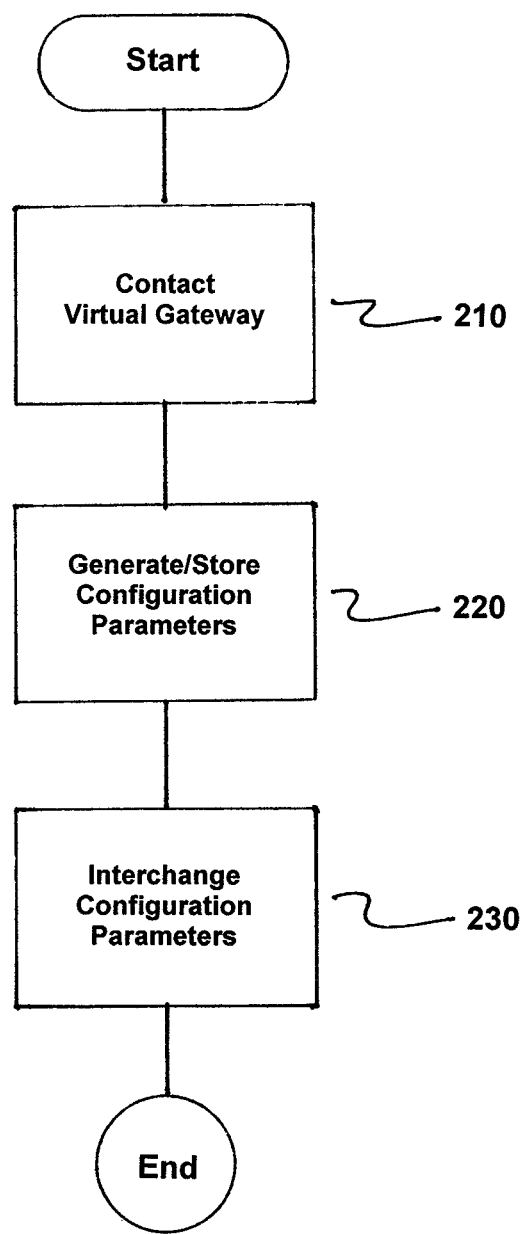
FIG. 2 is a flowchart of the method in accordance with an embodiment of the invention.

FIG. 2 is a flow chart of a method for redundantly operating an automation system comprising at least one user computer, a plurality of gateway computers and a plurality of programmable logic controllers, where the at least one user computer and the plurality of gateway computers is connected to a first bus system of a first type and the plurality of gateway computers and the plurality of programmable logic controllers is connected to a second bus system of a second type such that the plurality of programmable logic controllers can be at least one of controlled and monitored by the at least one user computer using one gateway computer of the plurality of gateway computers. The method comprises contacting, by the at least one user computer, a virtual gateway computer having a virtual identifier for all gateway computers of the automation system to set up a communication link between the at least one user computer and at least one programmable logic controller of the plurality of programmable logic controllers, as indicated in step 210. Here, the virtual gateway computer establishing a physical communication link to a selected gateway computer of the plurality of gateway computers.

Parameters for the communication link are generated and stored in a selected, active gateway computer, as indicated in step 220. The configuration parameters for the communication link is then interchanged between the active gateway computer and the remaining gateway computers, as indicated in step 230.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for redundantly operating an automation system comprising at least one user computer, a plurality of gateway computers and a plurality of programmable logic controllers, the method comprising:

contacting, by the at least one user computer, a virtual gateway computer having a virtual identifier for all gateway computers of the automation system to set up a communication link between the at least one user computer and at least one programmable logic controller of the plurality of programmable logic controllers, the virtual gateway computer establishing a physical communication link to a selected gateway computer of the plurality of gateway computers, the at least one user computer and the plurality of gateway computers being connected to a first bus system of a first type and the plurality of gateway computers and the plurality of programmable logic controllers being connected to a second bus system of a second type which is different than the first type of bus such that the plurality of programmable logic controllers can be at least one of controlled and monitored by the at least one user computer using one gateway computer of the plurality of gateway computers, and the plurality of gateway computers being connected between the first and second bus systems;

generating and storing configuration parameters for the communication link in a selected, active gateway computer;

interchanging the configuration parameters for the communication link between the active gateway computer and the remaining gateway computers; and establishing a new physical communication link between the at least one user computer and another one of the gateway computers of the plurality of gateway computers as a new selected gateway computer, if the selected, active gateway computer fails; and wherein after changeover from the failed selected active gateway computer to the new selected gateway computer, the new selected gateway computer recognizes the changeover from a message from the at least one user computer, the message being addressed to the virtual gateway computer, activates the communication link and is received from the user computer due to an interrupted old communication link.

2. The method as claimed in claim 1, wherein the interchanging of the configuration data includes implementing changes to configuration data.

3. The method as claimed in claim 2, further comprising: establishing a new physical communication link between the at least one user computer and another one of the gateway computers of the plurality of gateway computers as a new selected gateway computer, if the selected active gateway computer fails.

4. The method as claimed in claim 1, wherein the new physical communication link is automatically set up, the configuration parameters for the failed communication link which are stored in the new selected gateway computer being used for the new communication link.

5. The method as claimed in claim 3, wherein, after changeover from the failed selected, active gateway computer to the new selected gateway computer, the new selected gateway computer recognizes the changeover from a message from the at least one user computer, the message being addressed to the virtual gateway computer, activates the communication link and is received from the user computer due to an interrupted old communication link.

6. The method as claimed in one of claim 2, wherein the failure of the selected gateway computer is monitored by other gateway computers by comparing link data relating to the communication link, in which case, when the failure of the selected gateway computer is detected, another gateway computer of the plurality of the gateway computers, as the new selected gateway computer, automatically establishes the new communication link to the user computer.

7. The method as claimed in claim 1, wherein all gateway computers are configured identically and provide and manage a same address space.

8. The method as claimed in claim 1, wherein the configuration parameters comprise context objects for at least one of controlling and monitoring the programmable logic controllers.

9. The method as claimed in claim 1, wherein the configuration parameters stored in the gateway computers which have not been selected are not used as long as the selected gateway computer is operating as intended.

10. The method as claimed in claim 1, wherein, in addition to the configuration data, information relating to the programmable logic controllers connected to the virtual gateway computer is interchanged.

11. The method as claimed in claim 10, wherein the information relating to the programmable logic controllers connected to the virtual gateway computer is interchanged dynamically.

12. A gateway computer for redundantly operating an automation system comprising at least one user computer, a plurality of the gateway computers and a plurality of programmable logic controllers, the gateway computer being configured to:
  process a message from the at least one user computer to a virtual gateway computer having a virtual identifier for all gateway computers of the automation system to set up a communication link between the at least one user computer and at least one programmable logic controller of the plurality of programmable logic controllers, the gateway computer establishing a physical communication link to a selected one of the plurality of gateway computers, the at least one user computer and the plurality of gateway computers being connected to a first bus system of a first type and the plurality of gateway computers and the plurality of programmable logic controllers being connected to a second bus system of a second type which is different than the first bus system of the first type such that the plurality of programmable logic controllers can be at least one of controlled and monitored by the at least one user computer using one gateway computer of the plurality of gateway computers, and the plurality of gateway computers being connected between the first and second bus systems;
  to generate and store configuration parameters for the communication link;
  to interchange the configuration parameters for the communication link with remaining gateway computers of the plurality of gateway computers; and
  establishing a new physical communication link between the at least one user computer and another one of the gateway computers of the plurality of gateway computers as a new selected gateway computer, if the selected, active gateway computer fails; and
  wherein after changeover from the failed selected active gateway computer to the new selected gateway computer, the new selected gateway computer recognizes the changeover from a message from the at least one user computer, the message being addressed to the virtual gateway computer, activates the communication link and is received from the user computer due to an interrupted old communication link.

13. The gateway computer as claimed in claim 12, wherein the interchange of the configuration data includes implementing changes to configuration data.

14. An automation system comprising at least one user computer, a plurality of gateway computers and a plurality of programmable logic controllers, wherein the plurality of gateway computers are each configured to:
  process a message from the at least one user computer to a virtual gateway computer having a virtual identifier for all gateway computers of the automation system to set up a communication link between the at least one user computer and at least one programmable logic controller of the plurality of programmable logic controllers, the gateway computer establishing a physical communication link to a selected one of the plurality of gateway computers, the at least one user computer and the plurality of gateway computers being connected to a first bus system of a first type and the plurality of gateway computers and the programmable logic controllers being connected to a second bus system of a second type which is different than the first bus system of the first type such that the plurality of programmable logic controllers can be at least one of controlled and monitored by the at least one user computer using one gateway computer of the plurality of gateway computers, and the plurality of gateway computers being connected between the first and second bus systems;
  to generate and store configuration parameters for the communication link;
  to interchange the configuration parameters for the communication link with remaining gateway computers of the plurality of gateway computers; and
  establishing a new physical communication link between the at least one user computer and another one of the gateway computers of the plurality of gateway computers as a new selected gateway computer, if the selected, active gateway computer fails; and
  wherein after changeover from the failed selected active gateway computer to the new selected gateway computer, the new selected gateway computer recognizes the changeover from a message from the at least one user computer, the message being addressed to the virtual gateway computer, activates the communication link and is received from the user computer due to an interrupted old communication link.

15. The automation system as claimed in claim 14, wherein the first bus system is configured to perform communication based on Transmission Control Protocol/Internet Protocol.

16. The automation system as claimed in claim 15, wherein the second bus system is a proprietary installation bus comprising a field bus.

17. The automation system as claimed in claim 14, wherein the second bus system is a proprietary installation bus, in particular a field bus.

18. The automation system as claimed in claim 14, wherein the first bus system is configured to perform communication in accordance with Open Productivity and Connectivity standard.

19. The automation system as claimed in claim 14, wherein the second bus system is a proprietary installation bus.

20. The automation system as claimed in claim 14, wherein the proprietary installation bus comprises a field bus.

* * * * *